UNITED STATES PATENT OFFICE.

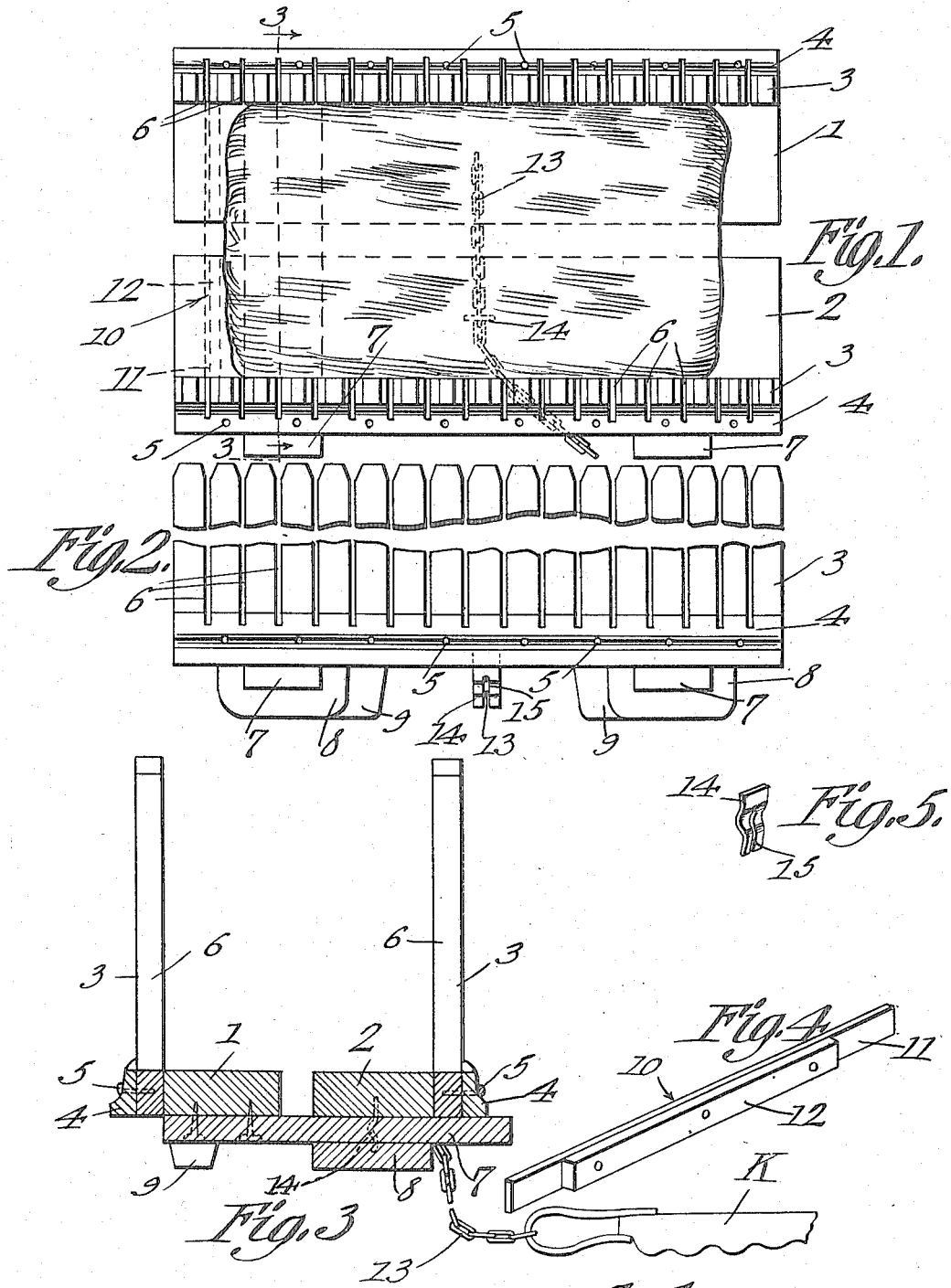

URI G. COON, OF MEDINA, NEW YORK.

BREAD-CUTTING GAGE.

1,131,333.   Specification of Letters Patent.   Patented Mar. 9, 1915.

Application filed November 24, 1914. Serial No. 873,754.

*To all whom it may concern:*

Be it known that I, URI G. COON, a citizen of the United States, residing at Medina, in the county of Orleans and State of New York, have invented a new and useful Bread-Cutting Gage, of which the following is a specification.

The present invention appertains to bread cutting gages, and aims to provide a novel and improved device of that character for holding a loaf of bread, whereby the bread may be cut or sliced in a uniform manner.

Another object of this invention, is to provide a bread cutting gage of unique construction, whereby it may be adjusted to accommodate various widths of loaves with equal success and propriety.

Another object of the invention is to provide in combination with the gage, a device applicable thereto for enabling the slices of bread to be cut thinner, and with the same uniformity.

It is also within the scope of the invention, to provide a bread cutting gage, the construction of which is comparatively simple and inexpensive, and the device being convenient, serviceable, efficient and practical in its use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in its preferred embodiment in the accompanying drawing, wherein—

Figure 1 is a plan view of the gage. Fig. 2 is a side elevation thereof, parts being broken away. Fig. 3 is a cross section of the device, taken on the line 3—3 of Fig. 1. Fig. 4 is a perspective view of the supplemental or auxiliary device for use in cutting thinner slices of bread. Fig. 5 is a perspective view of the chain catch.

The present gage embodies a longitudinally split or divided bottom comprising the longitudinal sections 1 and 2, and upstanding sides 3 are secured to the remote or outer edges of the bottom sections 1 and 2. To this end, mold strips 4 are disposed against the outer faces of the sides 3 adjacent the lower edges of the sides, and nails or other securing elements 5 are engaged inwardly through the mold strips 4, and the lower edge portions of the sides 3, and take into the bottom sections 1, to clamp the sides 3 between the bottom sections and mold strips. Thus, the sides 3 are firmly secured to the bottom sections, and furthermore, the mold strips lend a neat and ornamental appearance to the device. The sides 3 are provided with vertical slots 6 extending downwardly from their upper edges to the bottom sections 1, the slots at the opposite sides being in transverse alinement for the reception of a bread knife K.

In order to adjustably connect the bottom sections 1, a pair of transverse strips or shanks 7 are secured in any suitable manner to the bottom of the bottom sections 1, and project under the bottom section 2. Slotted guides or blocks 8 are secured to the bottom of the section 2 and the shanks 7 pass snugly and slidably therethrough, whereby the bottom section 2 may be slid upon the shanks 7 to and from the bottom section 1, when it is desired to adjust the sides 3 toward or away from each other.

Lugs or blocks 9 are secured to the bottom of the section 1 and form with the guides or blocks 8, supporting feet for the bottom sections 1, in order that the device may be readily supported upon a table or other surface.

Although the present gage may be readily constructed from wood, it is to be understood that metal or any other suitable material may be employed, if desired, with such minor changes as may be found necessary, and which are within the scope of the appended claims.

The supplemental or auxiliary gage device which is in the form of a stop, designated generally by the numeral 10, embodies a strip 11 having a cleat 12 secured in any suitable manner to one side thereof and terminating short of the ends of the strip 11. The use of this auxiliary gage or stop will be explained hereinafter.

A chain 13 is secured or anchored to the bottom of the section 1 and a catch or leaf spring 14 has one end secured within the bottom of the section 2, and is provided with a resilient or flexible portion protruding or depending from the section 2 and provided with an open slot 15 into which the links of the chain 13 are engageable, the protruding portion of the spring or catch 14 being bent on a compound curve, or being of such shape, as to readily receive and hold the links of the chain. The chain 13 may be sufficiently long, to have the bread knife K attached to the free end thereof, whereby the knife will be associated with the gage, and cannot be mislaid or lost. The chain 13 in being engaged to the spring or catch 13 will hold the sections 1 and 2 against separation, whereby the sides 3 may be held tightly against the sides of the loaf of bread.

In employing the present gage for cutting or slicing bread, cake, or the like, the sections of the gage are first separated in order to readily and conveniently receive the loaf of bread. This is accomplished by holding the ends of the section 2 by the hands, and placing the thumbs against the ends of the shanks or strips 7, and then forcing the thumbs toward the section 2, which will cause the sections 1 and 2 to separate. A loaf of bread may then be readily placed between the slotted sides 3 and upon the bottom sections 1, and in which event, the bottim sections 1 and 2 may be moved together by applying the hands to the ends of the bottom sections and carefully moving them toward one another. The sides 3 are thus brought snugly against the sides of the loaf, to hold the loaf snugly in place, to prevent its displacement. The chain 13 may then be engaged to the catch or spring 14 for holding the sides 3 of the gage tightly against the sides of the loaf, to hold the loaf snugly in place. The cutting or slicing the bread is facilitated, as will be obvious, by working the knife within the slots 3 in succession. In this manner, the bread may be sliced in a uniform and quick manner.

When it is desired to slice the bread thinner, for making sandwiches or the like, the supplemental gage or stop 10 is employed. Thus, as suggested in dotted lines in Fig. 1, the ends of the strip 11 may be inserted within a pair of the slots 6 of the sides 3, to enable the stop 10 to seat upon the bottom sections, with the cleat 12 so arranged as to have the end of the loaf rest thereagainst. Then, by inserting the bread knife in the succeeding pair of slots 6, a thin slice of bread may be cut off. Then, when the slice of bread is removed, the loaf of bread may be moved forwardly against the cleat 12, to cut the next succeeding slice, the operation being repeated until the desired number of thin slices have been cut. The stop 10 therefore serves to space the end of the loaf between two pairs of slots 6, whereby when the bread knife is inserted into a pair of the said slots, it may cut a thin slice off the said end of the loaf. The stop 10 may be employed, at any adjustment of the sections of the main gage, since the ends of the strip 11 project beyond the cleat 12 to adjustably engaged in the slots 6 of the gage sides 3. The stop 10 may be used in the main gage at any point along the length thereof, as is most desirable.

Having thus described the invention, what is claimed as new is:

A cutting gage comprising a bottom and slotted sides carried thereby, and a stop including a strip insertible into a pair of slots of the sides, and a cleat carried by one side of the strip and adapted to have the end of a loaf of bread rest thereagainst between two pairs of slots of the sides.

In testimony that I claim the foregoing as my own, I have hereto affixed my signature in the presence of two witnesses.

URI G. COON.

Witnesses:
CARL SANDERSON,
FLOYD CHUBBUCK.